UNITED STATES PATENT OFFICE.

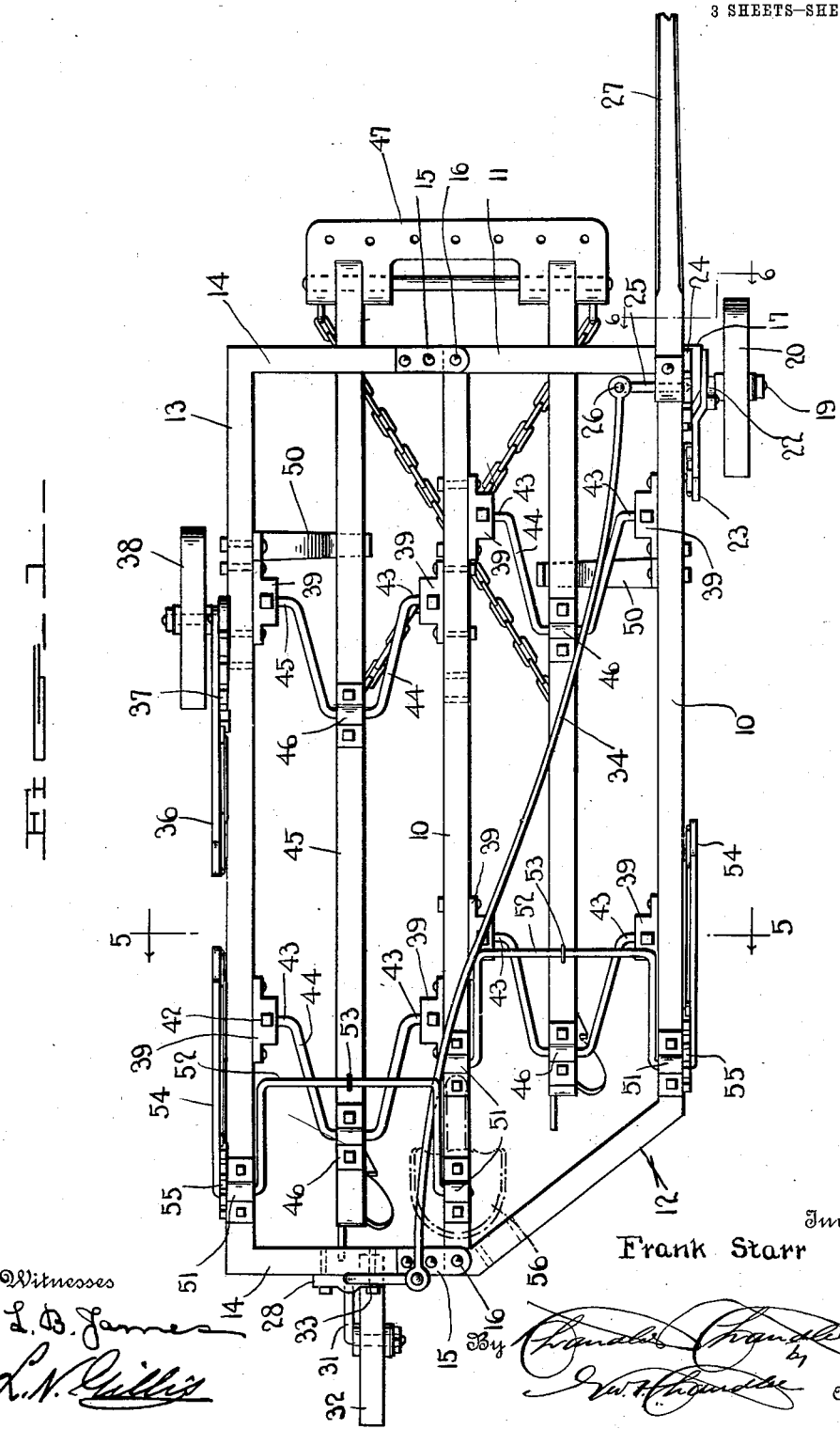

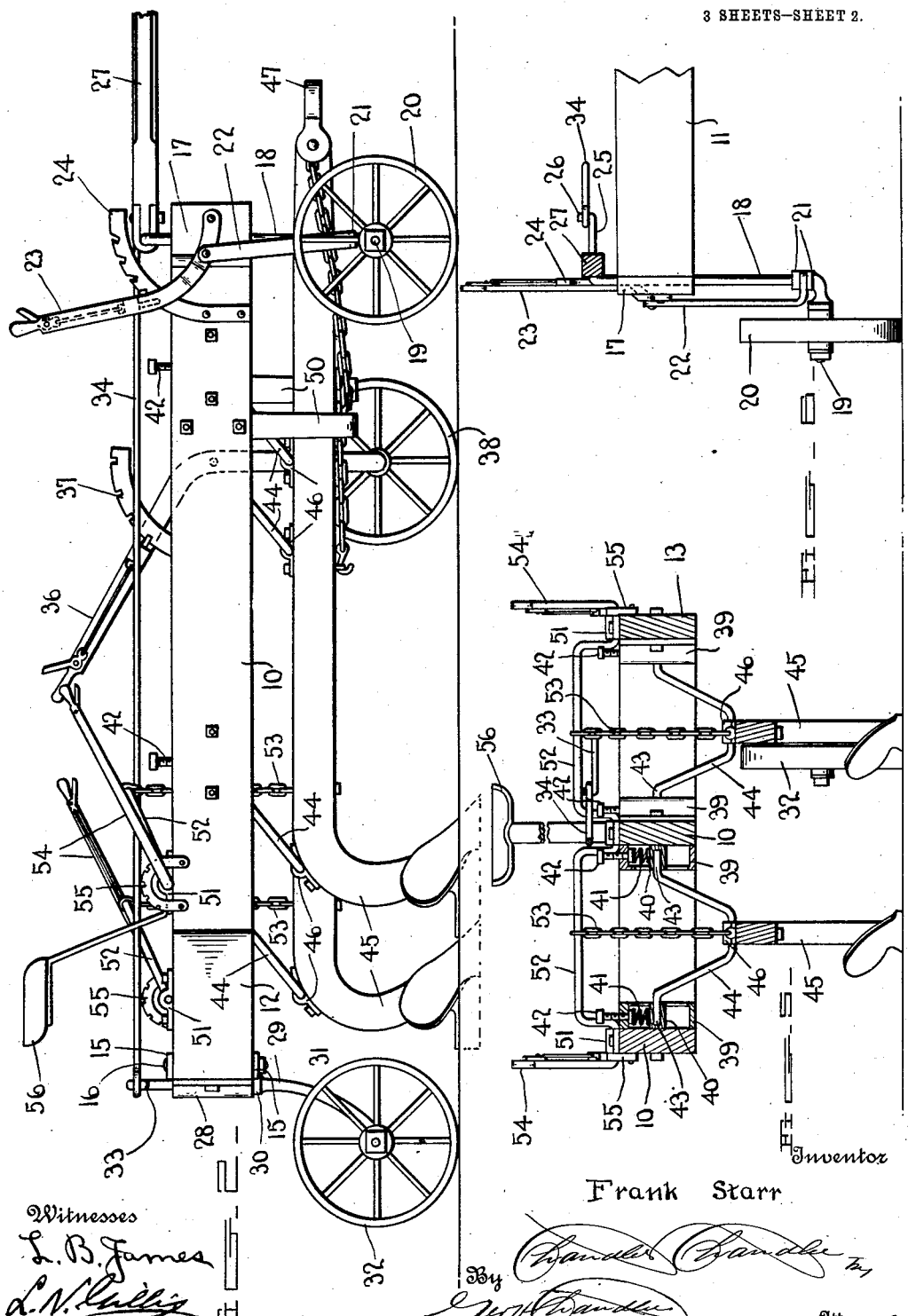

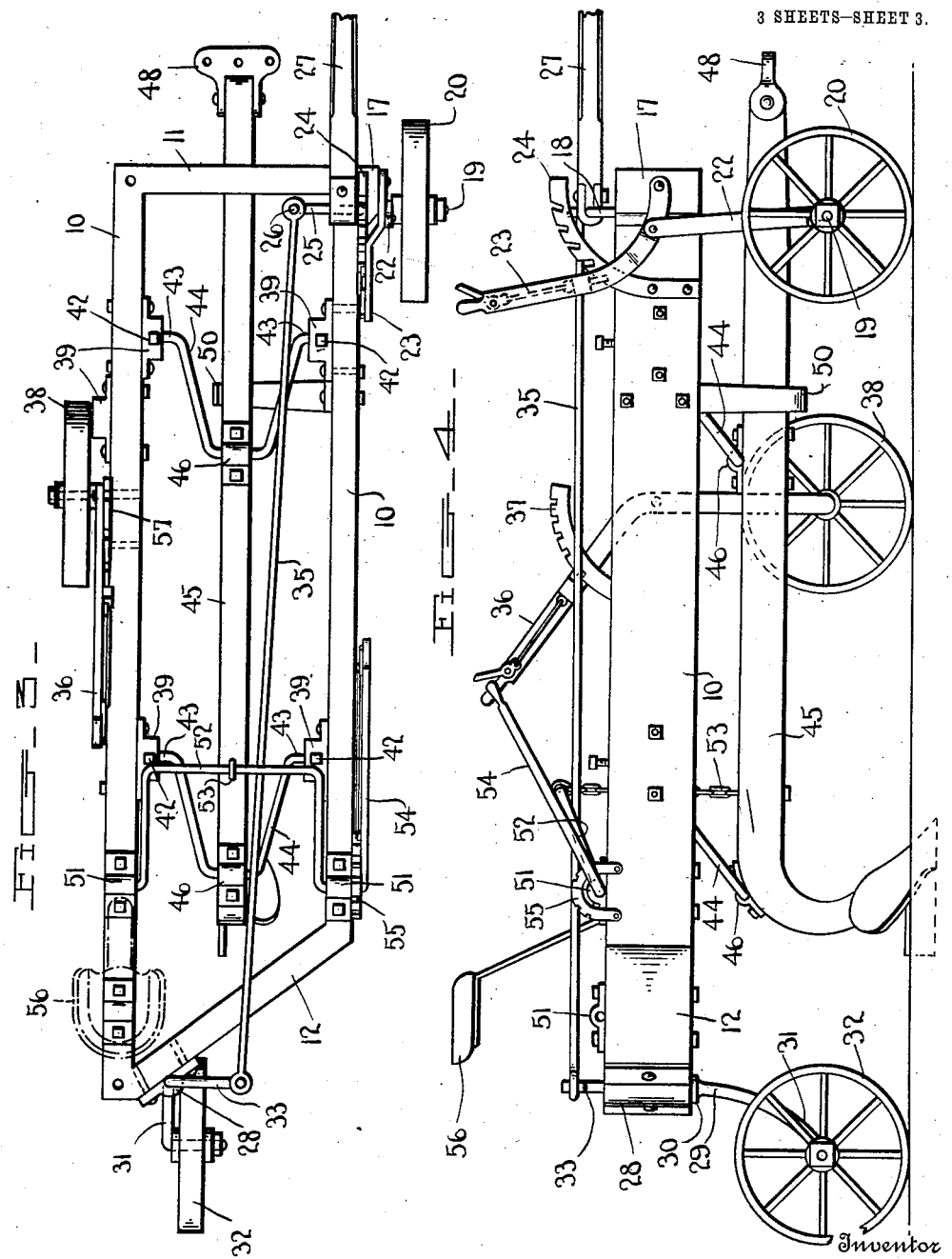

FRANK STARR, OF RICE, MINNESOTA.

GANG-PLOW.

1,033,207. Specification of Letters Patent. Patented July 23, 1912.

Application filed October 19, 1910. Serial No. 587,871.

*To all whom it may concern:*

Be it known that I, FRANK STARR, a citizen of the United States, residing at Rice, in the county of Benton, State of Minnesota, have invented certain new and useful Improvements in Gang-Plows; and I do hereby declare the following to be a full, clear, and exact description of the invention, such as will enable others skilled in the art to which it appertains to make and use the same.

This invention relates to agricultural implements and has special reference to a plow.

The principal object of the invention is to provide a plow which may be used either as a single or gang plow, the arrangement being such that when used as a single plow the plow frame may have certain portions removed so that not only the weight of the plow itself but a large proportion of the weight of the frame is taken off the draft animals.

Another object of the invention is to provide a plow of this character with means whereby the frame will support the plows in such manner that they may be raised or lowered with reference to the ground.

With the above and other objects in view as will be hereinafter apparent the invention consists in general of certain novel details of construction and combinations of parts hereinafter fully described, illustrated in the accompanying drawings, and specifically set forth in the claims.

In the accompanying drawings, like characters of reference indicate like parts in the several views, and; Figure 1 is a plan view of the device showing it in use as a gang plow. Fig. 2 is a side elevation thereof. Fig. 3 is a plan view of the device in use as a single plow. Fig. 4 is a side elevation of the arrangement shown in Fig. 3. Fig. 5 is a section on the line 5—5 of Fig. 1. Fig. 6 is a detail section on the line 6—6 of Fig. 1.

The frame of this invention consists of two portions one of which is in use all of the time and the other is attachable to or detachable from this portion and is only used when it is desired to arrange the device as a gang plow. What may be termed the permanent portion of the frame consists of longitudinal members 10 which are held in spaced relation at the forward end by a transverse member 11 and at the rear end by a diagonal member 12. What may be termed the auxiliary frame comprises a single longitudinal member 13 having a transverse member 14 at each end. On the transverse members 14 are bolted clips 15 and these clips extend beyond the end of their respective members and may be attached by means of suitable bolts or pins 16.

At the forward outer corner of the permanent frame there is provided a bearing 17 whereto extends a vertical shaft 18 having a lateral journal 19 at its lower end. On this journal 19 is a ground wheel 20 and the shaft 18 is provided with a pair of spaced collars 21 between which is received the end of a link 22 which is connected to a latch lever 23 working over a quadrant 24 secured to the frame. By means of this arrangement the frame may be raised or lowered on the vertical shaft 18 so that its distance from the ground may be varied. Extending laterally from the upper end of the shaft 18 is a crank arm 25 provided at its extremity with an upturned end 26. Pivoted for vertical motion only on the arm 25 is a guide pole 27 which may be attached at its forward end to the collar of the draft animal so that the movement of the animal to the right or left in turning the plow will have the effect of swinging the wheel in like direction.

At 28 is indicated a bearing bracket and this bearing bracket may either be attached to the rear transverse member 14 as shown in Fig. 1 or to the diagonal member 12 as shown in Fig. 3, the attachment being effected by ordinary bolts. Carried in this bracket is a vertical shaft 29 having a collar 30 at its lower end which bears against the underside of the bracket. The shaft is continued downward in a curve 31 and on its lower end is provided a lateral journal having a ground wheel 32. On the upper end of the vertical shaft 29 is a crank arm 33 and this crank arm extends in a direction opposite the crank arm 25, both lying normally transverse the frame. These crank arms 25 and 33 are connected either by a link 34 when the device is in use as a gang plow or by a link 35 when the device is in use as a single plow, the change of length being made necessary by reason of the fact that when the bracket 28 is positioned on the member 12 the distance from center to center of the vertical shafts will be less than when the bracket 28 is on the member 14.

At 36 is shown a latch lever which may either be attached to the member 13 as shown in Fig. 1 or to the member 10 as shown in Fig. 3. This latch lever operates over a quadrant 37 which is likewise capable of being adjusted either on the member 13 or the member 10. On the lower end of this latch lever there is provided a lateral journal whereon is carried a ground wheel 38. Now it will be obvious that by means of this arrangement the two forward wheels may be used for independently raising and lowering either side of the front end of the frame and that the two wheels which have their vertical shafts connected by the link are utilized for steering, the third wheel being so arranged that it cannot assume any other position than parallel to the longitudinal members of said frame.

On the members 10 and member 13 there are provided a plurality of pairs of guide members 39 in each of which is held a journal box 40 the same being normally kept at the lower end of the guide by a spring 41 the tension of which is capable of adjustment by means of the bolt 42 screwed through the top of the guide member 39. These journal boxes which move in the guides 39 are alined in pairs for the reception of the journal ends 43 of a plurality of pairs of yoke members or hangers 44 the central portion of which is substantially U-shaped.

The plow beams are indicated at 45 and on each of these beams are boxes 46 wherethrough extend the bight portions of the yokes 44. These plow beams are of sufficient length to extend forward of the main frame and the forward ends are connected when the device is in use as a gang plow by a clevis 47 while when the device is in use as a single plow the clevis is of course omitted and is replaced by the ordinary type of plow clevis as indicated at 48 in Fig. 3. In order to prevent the forward ends of the plow beams from dropping too low stop members 50 are provided which extend respectively from the outer member 10 and the member 13 and have their inner ends projecting beneath their respective plow beams 45.

In order to lift the rear end of the plow beams out of the ground when desired or to vary the depth to which they are to plow the members 10 and member 13 are provided with alined bars or bearings 51 each bar having a crank shaft 52 journaled therein and the cranks of these shafts are connected to the respective plow beams by means of chains 53. On the outer ends of the respective crank shafts 52 are latch levers 54 which work over quadrants 55. The device is provided with the usual driver's seat 56 and the ends of the levers 54 are brought convenient to this seat. It will thus be observed that by means of the above described yieldable bearings, the plows are resiliently supported for a purpose as will be readily understood by those skilled in the art.

The operation of the device is similar to that of any of the ordinary types of wheel plows but the invention varies from these plows in as much as the removable frame may be detached the wheel 38 positioned on the permanent frame on the side opposite the wheel 20 and the wheel 32 moved to the member 12. It will be seen that when this is done the plow is greatly lightened as not only is the plow beam 45 and frame removed but also the chains, long clevis 47, hangers 44 and the crank shaft 52 which belongs to the adjustable or auxiliary frame.

There has thus been provided a simple and efficient device of the kind described and for the purpose specified.

It is obvious that minor changes may be made in the form and construction of this invention without departing from the material principles thereof. It is not therefore desired to confine the invention to the exact form herein shown and described but it is wished to include all such as properly come within the scope of the appended claims.

What is claimed is:—

1. In a device of the kind described, a main frame, an auxiliary frame, means to detachably connect said main and auxiliary frames, a plow carried by the main frame, and a second plow supported by the main and auxiliary frames.

2. In a device of the kind described, a main frame, an auxiliary frame, means to detachably connect said auxiliary frame to the main frame, a plow carried by the main frame, a second plow supported by the main and auxiliary frames, means carried by the main frame for adjusting the plow with relation to said frame, other means supported by the main and auxiliary frames for adjusting the position of the second plow with relation to said frames, and wheels supporting said frames.

3. In a device of the kind described, a rectangular main frame, a U-shaped auxiliary frame including spaced legs and a connecting portion, means engageable with the free ends of the legs of the auxiliary frame to connect the same laterally to said frame, a wheel connected to the main frame, and other wheels adapted for connection to either the main or auxiliary frame.

In testimony whereof, I affix my signature, in presence of two witnesses.

FRANK STARR.

Witnesses:
 OLIVER CLINKART,
 JULIAN SOYKA.